Fig. I.
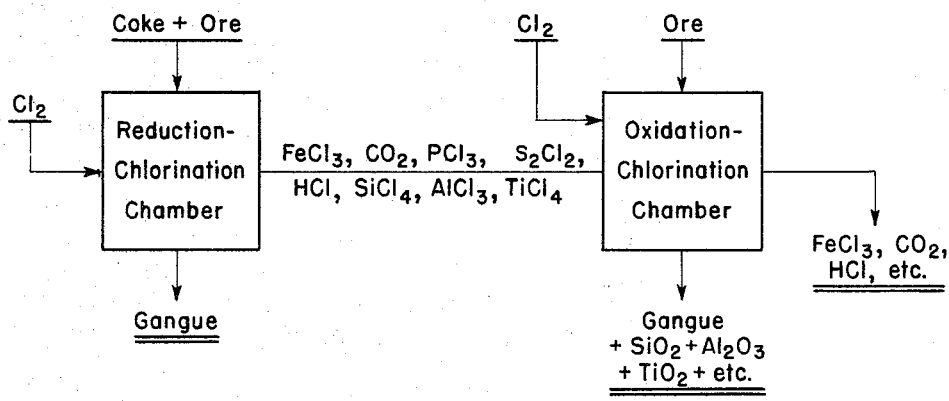
Fig. 2.
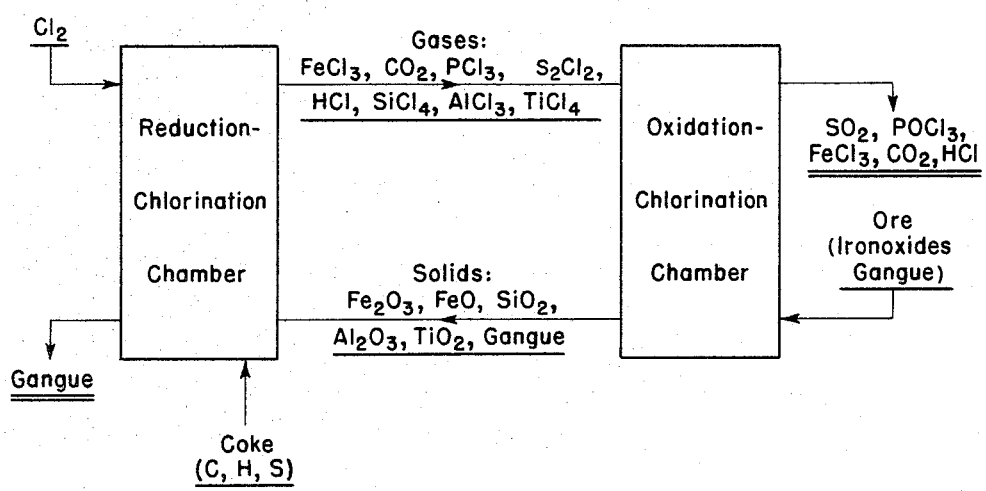
INVENTORS
Rudolf Nowak
Wilhelm Schuster
BY
Charles J. Elderkin
ATTORNEY

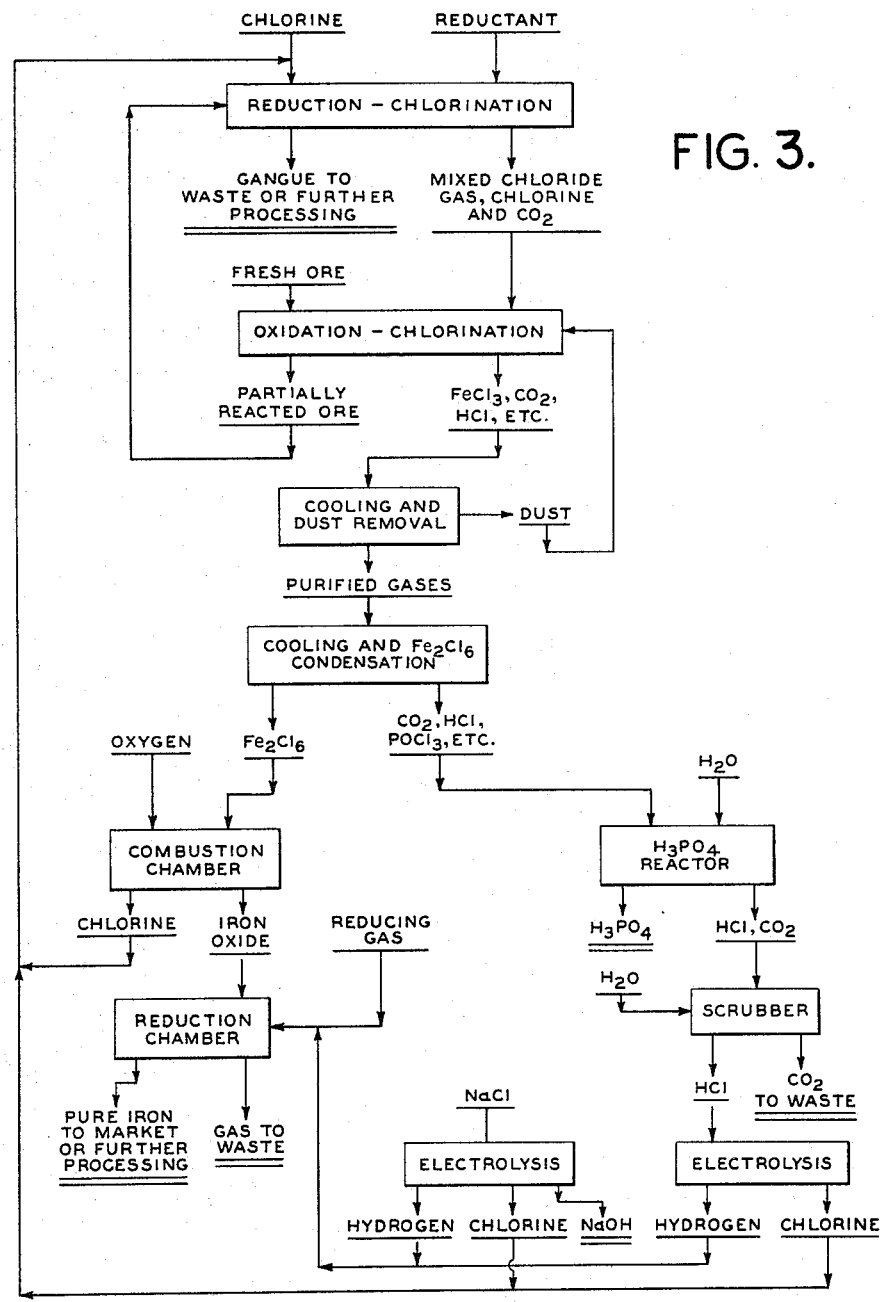

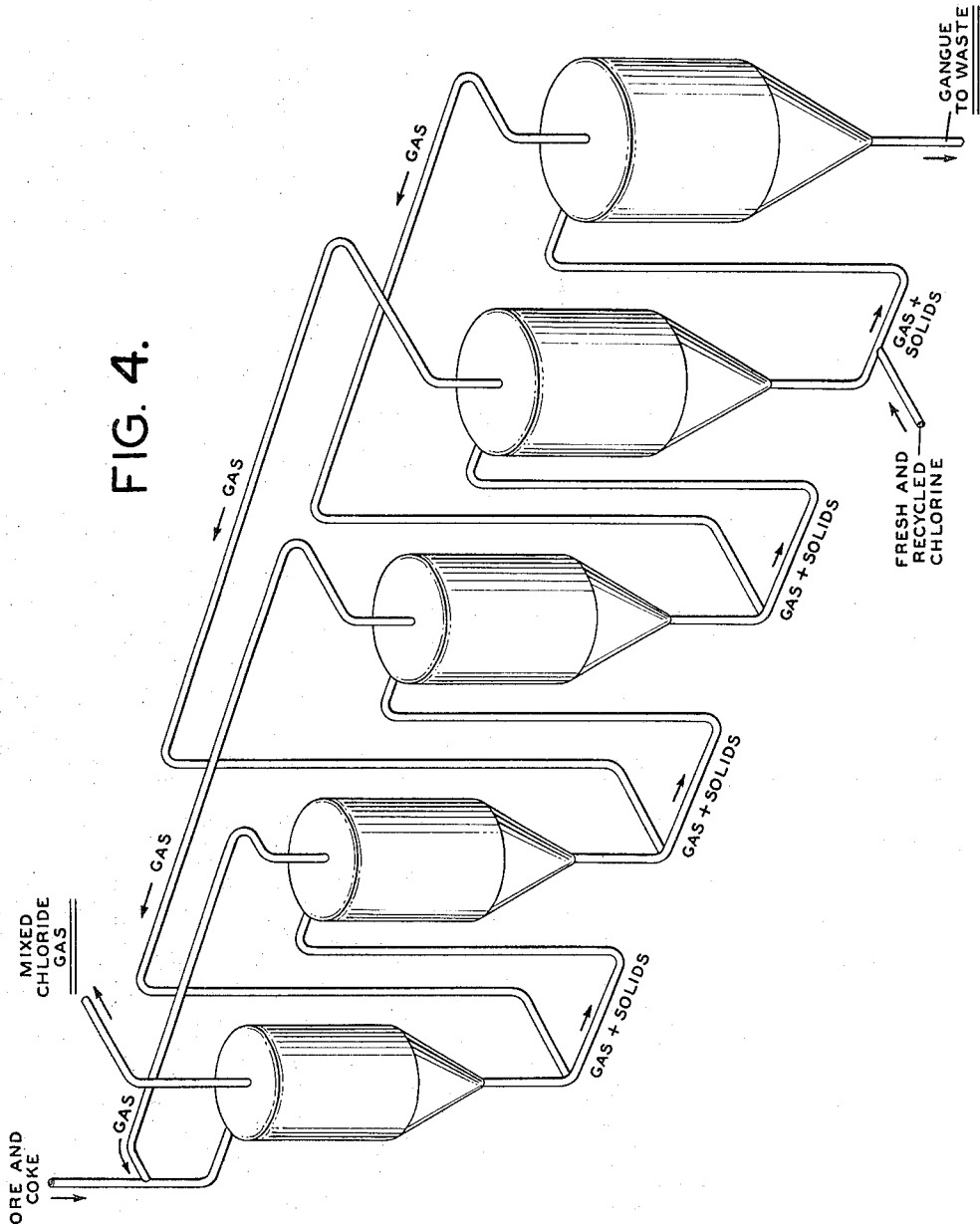

United States Patent Office 3,244,509
Patented Apr. 5, 1966

3,244,509
HALIDE PROCESS FOR EXTRACTION OF IRON FROM IRON-OXIDE-BEARING MATERIALS
Rudolf Nowak and Wilhelm Schuster, Frankfurt am Main, Germany, assignors of forty percent to M. H. Hoepli, New York, N.Y.
Filed Aug. 22, 1961, Ser. No. 133,086
21 Claims. (Cl. 75—29)

This invention relates to metallurgy, and more particularly to the production and recovery of iron and steel from all grades and types of iron oxide-bearing ores and other iron oxide-bearing materials, e.g., slags and burned ores, by a halide process. The process of the invention provides an efficient, highly economical means for the production of high-purity iron on a large scale, and features a low initial capital investment, high recovery of metallic values, and low losses of halogen.

While the reduction of iron ores in a manner which avoids the classic blast-furnace-open hearth route has always been a challenge to inventors, the last thirty years has seen a proliferation of such processes. Certain halide metallurgical processes have met with substantial success in the extraction and recovery of various non-ferrous metals, and this success has inspired many prior workers to attempt to design a process utilizing Group VII elements in the extraction of iron from its ores. Most of these processes are based on the separation of iron as ferric or ferrous chloride, which can then be converted to iron oxide and thence to iron.

Previous processes involving separation of iron as a chloride can be divided into four main groups: (1) ore chlorination with chlorine; (2) ore chlorination with hydrogen chloride; (3) reducing ore chlorination with carbon and hydrogen chloride; and (4) reducing ore chlorination with carbon or carbon monoxide and chlorine. Processes based on the first three types have not proved feasible for commercial scale operations, due to the fact that the necessary reactions:

$$Fe_2O_3(s) + 3Cl_2(g) = 2FeCl_3(g) + 3/2 O_2(g) \quad (1)$$

and $$Fe_2O_3(s) + 6HCl(g) = 2FeCl_3(g) + 3H_2O(g) \quad (2)$$

are highly endothermic, requiring very large quantities of heat, and even at high reaction temperatures the thermodynamic equilibria are such that the yields are small.

The processes of the fourth group, based on the reactions:

and/or

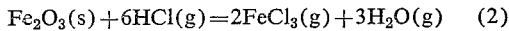

appear to be better at first glance, as the reactions are exothermic. It is found, however, that the combination of both reduction and chlorination is so powerful that, while the iron is chlorinated in quantitative measure, many of the other elements in the gangue are also chlorinated. While the time necessary for reduction and chlorination at reasonable temperatures is found to be favorably short, chlorination of other elements represents an irretrievable loss of chlorine, an expensive reactant, which renders the process uneconomic. If the reaction temperatures are lowered, smaller amounts of unwanted chlorides are formed, but the time necessary for complete separation of the iron becomes excessive, thus rendering this expedient uneconomic.

It is an object of the present invention to provide a chlorination process wherein all of the above disadvantages are overcome; the conversion of iron to ferric chloride is quantitative, the reaction times are short, and there is essentially no loss of chlorine due to the chlorination of gangue constituents of the starting material.

It is a further object of the present invention to provide a process in which all types and grades of iron oxide-bearing ores and other material may be utilized as starting materials, including marginal and low-grade ores, and ores containing titania, phosphorus and other impurities which normally render them unsuitable as starting materials for other types of extractive processes, and ores containing large percentages of fines, making them unsuited for blast furnace charging without prior application of expensive agglomeration procedures.

A further object of the present invention is to provide inexpensive apparatus in which the foregoing objects may be attained in an economic fashion and at high production rates.

It is believed that a more detailed understanding of the process of our invention, as well as the operation of the preferred type of apparatus for performing same, will be had by referring to the following detailed description thereof, taken in conjunction with the drawings, wherein:

FIG. 1 and FIG 2 illustrate in schematic form the essential steps of the invention;

FIG. 3 is a flow sheet or flow diagram illustrating in somewhat simplified form all the process steps involved in carrying out our invention; and FIG. 4 is a perspective drawing of a reduction-chlorination unit according to the preferred embodiment of the invention.

In essence, our invention is based on the fact that while chlorine and carbon will almost quantitatively chlorinate all of the constituents of most iron ores, ferric oxide will react with the various chlorides of gangue constituents to produce ferric chloride and the oxides of the gangue components. Thus, as described herein, the interaction of chlorine with the mixture of an iron oxide-bearing material and carbon is called "reducing chlorination" and the interaction of chlorides (with or without chlorine) with the iron oxide-bearing material alone is called "oxidizing chlorination."

The reducing chlorination involves the following principal reactions:

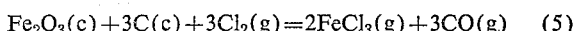
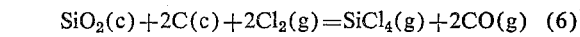
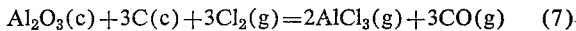
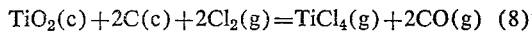
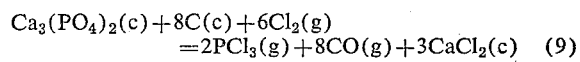
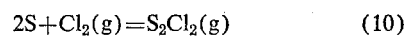
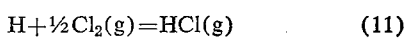

$$3CO(g) + Fe_2O_3(c) + 3Cl_2(g)$$
$$= 2FeCl_3(g) + 3CO_2(g) \quad (12)$$

The oxidizing chlorination involves the following reactions:

$$3SiCl_4(g) + 2Fe_2O_3(c) = 4FeCl_3(g) + 3SiO_2(c) \quad (13)$$

$$2AlCl_3(g) + Fe_2O_3(c) = 2FeCl_3(g) + Al_2O_3(c) \quad (14)$$

$$3TiCl_4(g) + 2Fe_2O_3(c) = 4FeCl_3(g) + 3TiO_2(c) \quad (15)$$

$$3PCl_3(g) + Fe_2O_3(c) + 3Cl_2(g)$$
$$= 2FeCl_3(g) + 3POCl_3(g) \quad (16)$$

$$3S_2Cl_2(g) + 4Fe_2O_3(c) + 9Cl_2(g)$$
$$= 8FeCl_3(g) + 6SO_2(g) \quad (17)$$

The reactions are exothermic, the reaction rates large and the conversions practically quantitative. Oxychlorides (except $VOCl_3$ and $POCl_3$) and phosgene were not expected to form and were not detected by analysis.

Thus, the oxidizing-chlorination following the reducing-chlorination largely prevents the formation of undesired chlorides. The processes taking place in the oxidation-chlorination chamber may be understood in terms of a "rectification of the gaseous chloride mixture."

As shown in FIG. 1, it is possible to first form a mixture of gaseous chlorides in the manner set forth above in relation to Equations (5) to (12) in a reduction-chlorination chamber, and then in the presence of nothing but fresh ore to remove the chlorides of elements other than iron and replace them with additional quantities of ferric chloride, according to the Equations (13) to (17) in a oxidation-chlorination chamber. The thus purified ferric chloride can then be converted to the oxide, the chlorine can be recovered, and the oxide reduced to iron powder and/or molten iron.

Briefly, according to our invention, the ore is chlorinated at a high temperature, generally within the range of from 800° to 1200° C., where the reaction rate is high and, due to the exothermic nature of Equations (3) and (4), substantial quantities of sensible heat can be recovered. Any type or grade of iron oxide-bearing ores and other iron oxide-bearing materials may be used, but it should be crushed preliminarily to fine dust thus ensuring a high reaction rate. As a reductant for the reducing chlorination, any type of carbon, e.g., coke, including low-temperature coke from brown coal, but also carbon monoxide can be used. In this connection, however, it should be noted that carbon monoxide is not a preferred reductant for use in the process of our invention, due to its somewhat lower reducing capacity as compared with solid carbon. It has been found advantageous to completely dehydrate the coke and ore, in order to effect the evolution of only the smallest possible quantity of hydrogen chloride during the chlorination step, so that only the smallest possible quantity of chlorine is lost from the chlorine cycle.

The recovery of chlorine from hydrogen chloride is expensive. While coke loses its humidity at temperatures of above 100° C., many ores need temperatures up to 800° C. for complete dehydration. To insure that the coke contains only a small quantity of chemically bound hydrogen, it is advisable to degas the coke at a rather high temperature e.g. at 1200° C.

Generally, the stoichiometric quantity of chlorine necessary to chlorinate the iron and phosphorus in the ore, along with hydrogen liberated by the reductant, is sufficient for purposes of the invention, but the stoichiometric calculation must be made on the basis of the total amount of ore in both the reducing-chlorination and oxidizing-chlorination reaction mechanisms. This is due to the fact that non-ferrous chlorides produced in the reduction-chlorination chamber quantitatively react with iron oxide in the oxidation-chlorination chamber so that the gaseous product of the latter reaction contains no other chlorides but ferric chloride, along with minor quantities of gaseous hydrogen chloride and phosphorus oxichloride. It is worthy of emphasis that, by virtue of the oxidizing-chlorination reactions, a high degree of economy is achieved in that no unwanted chlorides are formed and, hence, there is no irretrievable loss of chlorine due to the formation of such chlorides. It is in this respect that the process of the present invention departs basically from all known techniques of the same general class.

During the chlorination, reactions analogous to Equations (5) to (12) will result in the production of chlorides of silicon, sulfur, phosphorus, aluminum, titania and so forth, in addition to ferric chloride. Equations (5) and (12), involving the chlorination of iron, have a much higher reaction rate than the analogous reactions for nonferrous materials, so while all of the iron will be readily chlorinated, lesser quantities of the other elements will be carried over to the second chamber. In our invention, however, this is non-critical. As pointed out hereinbefore, it has been found that ferric oxide ($Fe_2O_3$) will react with these chlorides. In particular, it has been found that at these same temperatures, 800°–1200° C., ferric oxide will react with silicon and titanium tetrachlorides, aluminum chloride, and phosphorus pentachloride. Also, in the presence of excess free chlorine, ferric oxide will react with sulfur chloride, sulfur dichloride, and phosphorus trichloride. In all cases, the reaction product is ferric chloride and the oxides of silicon, aluminum, titanium and sulfur; phosphorus forms the oxichloride ($POCl_3$). It is to be noted that these reactions proceed only in a non-reducing atmosphere, but at the temperatures employed the reaction rate is high and conversion is practically quantitative. As all of the reactions are exothermic, additional quantities of sensible heat can here be recovered. Additionally, the oxides produced are solid at the reaction temperatures, with the exception of sulfur dioxide and phosphorus oxichloride, and are therefore easily separated from the gaseous ferric chloride.

Further, it has been found advantageous (FIG. 2) to employ fresh ore in the oxidation-chlorination chamber and, after reaction, to remove it to the reduction-chlorination chamber along with the necessary reductant and chlorine. After reaction in this chamber, an iron-free gangue is left; if the fresh ore contained titania in sizable amounts, as for example an ilmenite, it is to be noted that its presence in and iron-free gangue eliminates the major problem—i.e., iron contamination—to its economic recovery.

The gaseous product of the oxidation-chlorination chamber is principally ferric chloride and carbon dioxide, along with variable percentages of hydrogen chloride, sulfur dioxide and phosphorus oxichloride. The carbon dioxide is produced in the initial chlorination; hydrogen chloride is formed at the same time by reaction between chlorine and any hydrogen released from the reductant. The quantity of sulfur and phosphorus compounds depends, of course, on their presence in the ore and reductant. As will be pointed out hereinafter, however, no deleterious effects arise because of sulfur and phosphorus present in the starting material, and indeed the presence of phosphorus can be considered an advantage in the process of our invention.

After leaving the oxidation-chlorination chamber, the gaseous mixture is cooled down to approximately 320° C., and freed from entrained dust. These steps are necessary to avoid contamination of the ferric chloride with either dust or small quantities of heavy chlorides (e.g., $MnCl_2$, $CrCl_3$) which might be present. It has been found that both cooling and dust separation can be effectively accomplished in a cooling cyclone. The separated dust, including the heavy chlorides, is recycled to the oxidation-chlorination chamber. As can be readily seen, a closed cycle for the heavy chlorides is developed between this chamber and the cooling cyclone; formation of large quantities of such chlorides is suppressed in this manner, due to the partial pressure thereof in the gaseous mixture. Contamination of the ferric chloride by any such non-ferrous metal chlorides is thereby prevented.

After cooling and dust removal, the ferric chloride is next removed from the gaseous mixture by further cooling down to between 110° and 140° C. and separating the chloride in a $Fe_2Cl_6$ condenser as a solid. The solid ferrite chloride is then removed to a combustion chamber at about 120° C., where it is vaporized and decomposed by oxygen, introduced at a temperature between 800° and 950° C. It is also possible, alternatively, to heat the solid ferric chloride up to approximately 305° C., its melting point, and burn it with oxygen heated to about 400° C. The combustion temperature of ferric chloride is between 700° and 800° C., and the reaction products, pure iron oxide and chlorine, are separated. The chlorine is recycled to the reduction-chlorination chamber, and the iron oxide is reduced to pure iron, either in powder form or molten, with a reducing gas in the conventional manner. Producer gas, water gas, or any other reducing gas (e.g., natural gas) is suitable for the latter operation, and when molten iron is produced, it of course can be readily carburized and alloyed so as to make an iron or steel alloy of any desired composition which will be entirely free of all unwanted impurities. As the economic production of most reducing gases involves the carrying-over of some sulfur in the form of hydrogen sulfide, it has been found advantageous to purify the reduction gas prior to contact with the iron oxide, thus eliminating the possibility of sulfur contamination of the iron. This can be done inexpensively by first contacting the reducing gas with a small quantity of iron powder or powder of iron oxide-bearing material, which serves as a collector of sulfur. This contaminated powder can then be fed along with the coke dust, into the reduction-chlorination chamber. In a continuous process, this expedient involves merely a small circulating load of iron, and has the advantage of insuring the purity of the iron product.

Recovery of valuable elements in the gaseous mixture, after separation of ferric chloride, forms, the final stage of our process. Separation of the phosphorus oxichloride as phosphoric acid is the first step, as it has been found that between 110° and 140° C., the temperature of the gas after $Fe_2Cl_6$ condensation, gaseous phosphorus oxichloride reacts quantitatively with water or water vapor giving phosphoric acid and hydrogen chloride, according to the following equation:

$$POCl_3 + 3H_2O = H_3PO_4 + 3HCl \qquad (18)$$

It is to be noted that while in the reduction-chlorination chamber both phosphorus trichloride and phosphorus pentachloride will be produced, both of these compounds will be converted to phosphorus oxichloride in the oxidation-chlorination chamber. It is to be further noted that in areas where phosphate deposits exist and there is a demand for phosphoric acid, the foregoing process measures can be adapted to the tonnage production of phosphoric acid in addition to iron, by adding crude phosphate to iron ore before starting the whole process, thereby providing a valuable byproduct which further reduces the cost of the iron. Furthermore, as iron ores with high phosphorus contents can be obtained at lower prices, still further economies can be effected in the utilization of these ores.

In practice, the gas stream is sprayed with water which vaporizes at the reaction temperature, and an aerosol of phosphoric acid is formed. This is absorbed in concentrated phosphoric acid in the conventional manner.

The residual gas, now enriched in hydrogen chloride from Equation (18), is scrubbed with water or dilute HCl to remove all of the hydrogen chloride therefrom. The remaining gas, consisting largely of carbon dioxide, is vented to the atmosphere. The hydrogen chloride, now in solution, is electrolyzed to produce free hydrogen and chlorine. The chlorine is recycled to the reduction-chlorination chamber, and the hydrogen is utilized as an additive to the reducing gas necessary in the iron reduction.

Any sulfur dioxide in the gas stream will be carried along with the $CO_2$, owing to the temperatures involved during $H_3PO_4$ and HCl absorption. While the volume of $SO_2$ will generally be so low that it can be vented with the $CO_2$, it can be scrubbed from the gas stream if necessary.

A small chlorine loss is unavoidable, being mostly attributable to mechanical adherence and/or chemical bonding of chlorine with the gangue in the reduction-chlorination chamber. Fresh chlorine to make up for this loss may be conveniently supplied by a relatively small alkali chloride electrolysis unit. Energy necessary for this electrolysis as well as the electrolysis of HCl is supplied by practicing heat economy at the heat-producing stages of the process. That is, the heat resulting from chlorination of the ore, combustion of the ferric chloride, and the heat of cooling the gaseous reaction products after chlorination, the gangue, the gases resulting from the ferric oxide reduction, and absorbing the hydrogen chloride are all transformed into electrical energy for the electrolysis operation.

The alkali chloride electrolysis is most economically carried out utilizing sodium chloride. In addition to hydrogen and chlorine, the electrolysis also produces sodium hydroxide. The sodium hydroxide can either be sold directly as a byproduct or used within the process to provide a recovery of sodium chloride and a concentration of heavy non-iron metals of the gangue. The foregoing is accomplished by washing the gangue with a dilute solution of the byproduct NaOH, which produces an alkaline solution containing all the chlorides from the gangue. This solution is then treated with the waste gas from the HCl absorber, which gas contains substantial quantities of $CO_2$. The $CO_2$ reacts with the chlorides in the solution, precipitating therefrom a carbonate sludge containing all of the metals present in the gangue as heavy chlorides, such as manganese, nickel and chromium. After removal of these minerals, the solution contains only sodium chloride, which is recycled to the electrolysis unit.

The manner in which the process steps of our invention may be accomplished in an economical and efficient manner may be seen from the following description of a preferred embodiment of an apparatus which can be used in carrying out the above-described process measures. It is of course to be understood that the process may be carried out in a wide variety of ways, and that the following description only illustrates one possible combination of apparatus which it is believed will serve to render the invention more readily understandable; it is not intended, however, to limit the invention as hereinafter claimed in any manner.

The selection of the best reactor for a given situation depends on both interior and exterior design requirements. The physical form of the raw materials, waste disposal problems, and energy costs must be given equal consideration along with the requirements of reaction and separation which turn the raw materials into useful products. With the present invention, a system is presented wherein gaseous substances are reacted chemically and/or physically in countercurrent relation with granular substances which are finely-divided. There must be an excellent heat transfer between the gas and the solid, the finely-divided ore must not ultimately become part of the gas stream, and the reactor must operate at a high gas velocity so as to attain sufficient production to be economical. Conventional reactors such as tanks, rotary kilns, and fluidized beds, all contain serious drawbacks; reaction tanks arranged in cascade suffer from a low gas velocity which lowers production, in that, any higher gas velocity would pick up the fine ore and carry it along. The same can be said for rotary kilns, and heat transfer in both types of reactors is poor due to the long retention time of the solids in the reactor. The fluidized bed towers (comprising several fluidized beds) feature excellent heat transfer characteristics and gas velocities can be adjusted to essentially any level as long as velocity is related to the diameter of the reactor. Fine dust will be carried along with the gas stream, however, and can plug the lead-through trays, causing a serious stoppage.

It has been found that the common cyclone or hydrocyclone, long used in metallurgical plants for the separation of gases and solids or liquids and solids, meets all of the aforementioned design requirements when slightly altered for use as a reactor. While also functioning as a reactor, a cyclone will also retain its previous functions, thereby eliminating waste removal and dust problems.

In applying cyclones as reactors in the present invention, it is advantageous to employ several units connected in series to effect complete reaction of the ore and gas. The exact number of units required depends, of course, on the reaction rate, as determined by temperature, particle size, etc. In operation of the reducing-chlorination stage, for example, fresh chlorine is put in at one end of the series of cyclones and ore and coke are put in at the other end. At each cyclone the solid is initially mixed in the high velocity gas stream and fed into the cyclone, where the desired reactions take place, and the chloride-rich gas and the remaining solid are separated. The gas and solid then continue in countercurrent fashion to the next unit. Advantages of such a unit are that there is thorough mixture of gas and solid, heat transfer is exceptionally high, the mixture can be heated or cooled quickly by means of heating or cooling apparatus installed in the jacket of the cyclone, and with high gas velocities and finely-divided ore having a large surface area, reaction times are very short. When the small size and low expense of such an installation are considered, the rate of production is exceptionally high. Conveyance of the reactants from one reactor to the next is extremely simple: the dust discharged from one reactor is immediately taken into the stream of gas going into the next reactor, and so forth. By keeping the gas velocity high, the process becomes essentially automatic.

As both the reducing-chlorination reaction and the oxidizing-chlorination reaction of the present invention are exothermic, the walls of the cyclones are advantageously fitted with double walls or tubing and insulation, so that the sensible heat may be recovered and the reaction temperature readily controlled. As the system is "closed," thermal efficiency is very high.

Due to the fact that as applied to the present invention the cyclones are operating at higher temperatures and with different materials than in their normal applications, a refractory lining is required. It is preferred that this lining be of a magnesium spinel composition, as it has been found that such a lining is largerly impervious to chlorine and chlorides, even in a reducing atmosphere. Piping between the various cyclones in the series can be similarly jacketed and lined.

In addition to using groups of cyclones in countercurrent arrangement for the reducing-chlorination and oxidizing-chlorination reactions, it has been found advantageous to use individual cyclone units in other capacities in the process. Thus, cooling and dust removal can be effected simultaneously on the gas issuing from the oxidizing-chlorination in a cyclone, another group of cyclones can be utilized as the reduction chamber for reducing the pure iron oxide, and other cyclones can be used for ancillary jobs such as ore drying and preheating and other heat transfer purposes.

A better understanding of the invention will be gained by referring to the following detailed examples thereof, which are intended to be illustrative only and are not to be interpreted in a limiting sense.

EXAMPLE I

In the following example (FIG. 3), the reducing-chlorination and oxidizing-chlorination steps were both carried out in countercurrent cyclone banks as heretofore described and as illustrated in FIG. 4. These cyclone banks will be referred to as the "reduction-chlorination chamber" and "oxidation-chlorination chamber," respectively. For purposes of simplicity and ease of understanding, auxiliary equipment (crushers, heaters, etc.) is not shown in FIG. 3.

In the test, iron ore and brown coal low-temperature coke of the following compositions were used.

*Iron ore*

|  | Percent |  | Percent |
|---|---|---|---|
| Fe | 30.0 | $Al_2O_3$ | 8.0 |
| Mn | 0.2 | CaO | 4.0 |
| P | 0.5 | MgO | 2.0 |
| $SiO_2$ | 25.0 | $H_2O$ | 10.0 |

*Brown coal low-temperature coke*

|  | Percent |  | Percent |
|---|---|---|---|
| C | 61 | S | 1 |
| $H_2O$ | 20 | H | 2 |
| Ash | 15 | O+N | 1 |

285 kgs. of brown coal low-temperature coke were crushed in a crushing device to a particle size of 0.05 mm. at a maximum and heated in countercurrent in a drying device with nitrogen at 280° C.

3333 kgs. of iron ore were also crushed in a crushing device to a grain-size of 0.05 mm. at a maximum and dried in a drying device with the help of an oil burner; by this treatment the ore was heated to 800° C. The waste gases from the drying devices were separated from dust in a heat-insulated cyclone, washed in a washer, and vented to the atmosphere.

The 280° C. hot coke dust from the drying device and the coke-ore-dust mixture from the heat-insulated cyclone were led into the reduction-chlorination chamber. The 800° C. hot ore dust (together with the recycle dust from the cooling cyclone) were put into the oxidation-chlorination chamber. Ore dust was conveyed from the oxidation-chlorination chamber into the reduction-chlorination chamber where it was mixed with the coke dust. The iron-free gangue mixed with the coke ash was discharged from the reduction-chlorination chamber after reaction by means of a conveyer. 690 cubic meters (=2226 kgs.) of chlorine were led into the reduction-chlorination chamber at a temperature of 30° C. and were there heated (by liberated chemical heat and by contact with the gangue in countercurrent thereto) to about 800° C., cooling the gangue at the same time to about 280° C. Because of the highly exothermic reactions occurring in both oxidation-chlorination and reduction-chlorination chambers, considerable amounts of excess heat are set free which may be collected by water.

The chlorine flows through both the reduction-chlorination and oxidation-chlorination chambers countercurrent to the dust. The gaseous reaction products leave the oxidation-chlorination chamber and are then separated from dust and simultaneously cooled down to 320° C. in a cooling cyclone, and thereafter they are filtered in a hot gas filter to separate remaining fine-dust particles.

Solid ferric chloride was separated at 120° C. from the purified gaseous mixture in the $Fe_2Cl_6$-condenser. The remaining gas was led from the $Fe_2Cl_6$-condenser into the $H_3PO_4$-reactor. Here, 29.4 kgs. of cold water were sprayed into the reactor. The water evaporated and 61.7 kgs. of phosphoric acid of 86 percent were formed as an aerosol, which was absorbed in concentrated phosphoric acid. The temperature in the $H_3PO_4$-reactor rises during the formation of phosphoric acid from 120° to 140° C.

The gas mixture coming out of the $H_3PO_4$-reactor was at 140° C. and contained practically only carbon dioxide and hydrogen chloride, which was absorbed in the HCl-absorber (scrubber) in a countercurrent of approximately 10 percent hydrochloric acid. Heat set free during absorption and the sensible heat of released gases was recovered by cooling the absorber.

The hydrochloric acid solution (approximately 33 percent) was led from the HCl-absorber to the hydrochloric acid electrolyzer, where 81 cubic meters (=263 kgs.) of chlorine and 82 cubic meters of hydrogen were formed. A 10 percent hydrochloric acid solution remained after electrolysis and was reused for countercurrent absorption in the HCl-absorber.

In carrying out the process, 1500 cubic meters of air were separated in an air-separation plant into 300 cubic meters of oxygen and 1200 cubic meters of nitrogen. The oxygen was heated up to 400° C. in an oxygen heater by means of an oil burner.

The 120° C. solid ferric chloride was conveyed from the $Fe_2Cl_6$-condenser into an $Fe_2Cl_6$-heater and heated by an oil burner to 308° C. The resulting molten $Fe_2Cl_6$ was burnt by the hot oxygen in the combustion chamber, yielding ferric oxide and free chlorine at a combustion temperature of 730° C.

Most of the hot ferric oxide (approximately 90%) was immediately separated from the chlorine in the combustion chamber. Further amounts were separated in a cooling cyclone where the chlorine was cooled down to 30° C. The remaining ferric oxide was taken from the gas in a fine-dust filter. The collected iron oxide was then conveyed into the reduction chamber.

1425 kgs. of ferric oxide and 590 cubic meters (=1930 kgs.) of chlorine were formed in the combustion chamber. In an NaCl-electrolyzer, 68 kgs. of sodium hydroxide, 19 cubic meters of chlorine, 19 cubic meters of hydrogen were formed electrolytically from 100 kgs. of sodium chloride. The united amounts of chlorine (i.e., the fresh chlorine from the NaCl-electrolyzer, and recycled chlorine from the HCl-electrolyzer and the combustion chamber), were recycled into the reduction-chlorination chamber, in a countercurrent to the hot coke-ore mixture.

700 cubic meters of nitrogen from the air-separation plant were led into a nitrogen heater, where they were heated up by the waste gangue from the reduction-chlorination chamber in a countercurrent to a temperature approaching 280° C., cooling down the gangue at the same time to about 120° C. Thereafter, the hot nitrogen was led into the drying device where it dried the brown coal low-temperature coke.

1613 kgs. of the mixture of gangue and coke ash were discharged from the nitrogen heater at a temperature of 120° C. into a cooler, where they were cooled down to 20° C. and are banked out. The gangue can be used, for example, for the production of building materials or as a source for valuable nonferrous metals. The latter is particularly true when titania is present in the gangue.

1800 cubic meters of water gas were produced from 530 kgs. of brown coal coke, air, and steam in a gas generator. This water gas was combined with 101 cubic meters of hydrogen from the NaCl-electrolyzer and from the HCl-electrolyzer. This reducing gas mixture, now 1901 cubic meters, was led into the reduction chamber, where it reduced the 1425 kgs. of iron oxide at 1000° C., giving 1000 kgs. of pure iron. The waste gases of the iron-oxide reduction from reduction-chlorination chamber were led off through a cooling cyclone and washer, and vented to the atmosphere.

The iron can be marketed as pure iron powder or it can be melted and alloyed in a furnace. The iron powder can be carburized during the reduction by means of carbon monoxide or hydrocarbon-rich gases, e.g., methane. A powder of purest carbon steel is thus obtained, which is extremely useful for the production of articles via powder metallurgical techniques. Also, every kind of steel can be produced from the pure iron by alloying with other suitable elements, such as carbon, sililcon, manganese, chromium, and nickel.

Approximately 4000 kgs. of steam at 34 atmospheres, or 3,350,000 kcal., are recovered by cooling in various parts of the whole plant and are transformed into electric energy (880 kw.-hrs.). This amount of energy suffices for the electrolyses; 660 kw.-hrs. for the HCl-electrolysis, and 200 kw.-hrs. for the NaCl-electrolysis being used.

EXAMPLE II

The following example of a production plant with an hourly output of 50 metric tons of pure iron illustrates the production of 1 metric ton of iron from a titaniferous ore according to the process of our invention. Since phosphoric acid is not here recovered, the $H_3PO_4$-reactor shown in FIG. 3 is not required.

| Composition of the ore: | Percent |
|---|---|
| $TiO_2$ (10.00% Ti) | 16.70 |
| FeO (16.10% Fe) (25.02% Fe) | 20.72 |
| $Fe_2O_3$ (8.92% Fe) | 12.74 |
| $SiO_2$ | 23.07 |
| $Al_2O_3$ | 17.80 |
| MnO | 3.13 |
| CaO | 2.21 |
| MgO | 1.04 |
| Alkali oxides | 2.19 |
| $H_2O$ | 0.40 |
| | 100.00 |

Coke-oven coke is used as reducing agent.

| Composition of the coke: | Percent |
|---|---|
| C | 81.00 |
| Ash | 8.00 |
| $H_2O$ | 8.00 |
| O+N | 1.60 |
| S | 0.90 |
| H | 0.50 |
| | 100.00 |

156 kgs. of coke were crushed in a crushing device to a particle size of 0.05 mm. at a maximum and dried in a countercurrent manner in a drying device with nitrogen at 520° C.

4,000 kgs. of titaniferous iron ore were also crushed in a crushing device to a grain size of 0.1 mm. at a maximum and dried in a dryer by means of an oil burner; by this treatment the ore was heated up to 800° C. The waste gases from the drying devices were separated from dust in a heat-insulated cyclone and washed in a washer, so that they could be vented dust-free.

The coke dust leaving the drying device at a temperature of 520° C. and the coke-ore-dust mixture from the heat-insulated cyclone were led into the reduction-chlorination chamber. The ore dust of 800° C. together with the recycled dust from the cooling cyclone was introduced into the oxidation-chlorination chamber. The partially reacted ore dust was conveyed from the oxidation-chlorination chamber into the reduction-chlorination chamber, where it is mixed with the coke dust. The iron-free gangue mixed with the coke ash was discharged from the reduction-chlorination chamber by means of a conveyer. 610 cubic meters (=1,963 kgs.) of chlorine at a temperature of 30° C. were fed into the reduction-chlorination chamber; owing to the contact with the gangue and liberated heat they were heated up to 800° C., the gangue being cooled down to 520° C. Owing to exothermic reactions in both chlorination chambers, excess heat was set free, which was recovered by cooling.

The chlorine flowed through both chlorination chambers in a direction opposite to that of the ore dust. The gaseous reaction products leaving the oxidation-chlorination chamber were separated from dust and simultaneously cooled down to 320° C. in the cooling cyclone; thereafter they passed into a hot-gas filter, where they were separated from remaining fine-dust particles.

Solid ferric chloride was separated at 120° C. from the purified gaseous mixture in the $Fe_2Cl_6$-condenser. The gas mixture, containing practically only carbon dioxide and hydrogen chloride, left the $Fe_2Cl_6$-condenser at a temperature of 120° C. to enter the HCl-absorber where hydrogen chloride was absorbed in a countercurrent process with cold hydrochloric acid (approximately 10%). The heat set free during the absorption of HCl and the sensible heat released by the gases is recovered by cooling in the HCl-absorber.

The hydrochloric acid obtained (approximately 33%) was led from the HCl-absorber to the hydrochloric acid electrolyzer where 9 cubic meters of chlorine and 9 cubic meters of hydrogen were recovered. A solution of approximately 10 percent hydrochloric acid remained after the electrolysis and was re-used for hydrogen-chloride absorption in the HCl-absorber.

1,500 cubic meters of air were separated in an air-separation plant into 300 cubic meters of oxygen and 1,200 cubic meters of nitrogen. In the oxygen heater the 300 cubic meters of oxygen were heated up to 860° C. by means of an oil burner.

The solid ferric chloride (at 120° C.) was conveyed from the $Fe_2Cl_6$-condenser into the combustion chamber (e.g., by a worm), where the ferric chloride was vaporized and burnt by the hot oxygen, yielding ferric oxide and chlorine at a combustion temperature of 730° C.

The greater part of the hot ferric oxide (approximately 90%) was separated from the chlorine in the combustion chamber. The chlorine was cooled in a cooling cyclone down to 30° C., and further amounts of ferric oxide were there separated; subsequently, the residual ferric oxide was separated from the gas in a fine-dust filter. The iron oxide resulting from the combustion chamber, the cooling cyclone, and the fine-dust filter was conveyed into the reduction chamber.

1,425 kgs. of ferric oxide and 590 cubic meters (=1,903 kgs.) of chlorine were formed in the combustion chamber. In the NaCl-electrolyzer, 36.5 kgs. of sodium hydroxide, 11 cubic meters (32.3 kgs.) of chlorine and 11 cubic meters of hydrogen were electrolytically recovered from 53.3 kgs. of sodium chloride. The chlorine recovered from the NaCl-electrolyzer and from the HCl-electrolyzer was mixed with the chlorine from the combustion chamber and subsequently recycled into the reduction-chlorination chamber (in a direction opposite to the hot, coke-ore mixture).

From the air-separation plant, 200 cubic meters of nitrogen were led into a nitrogen heater, where the nitrogen was heated up to 520° C. by the hot gangue in a countercurrent process, the gangue being cooled down to 474° C. Then, the hot nitrogen was led into the drying device, where it dried the coke as aforesaid.

2,684 kgs. of the mixture of gangue and coke ash were discharged from the nitrogen heater at a temperature of 474° C., flowing into a cooler where they were cooled down to 24° C. The completely iron-free mixture of gangue and coke ash contained 400 kgs. of titanium (approximately 15%) and was used as the raw material for the recovery of titanium.

1,882 cubic meters of water was were produced in a gas generator, and passed to the reduction chamber at a temperature of 1,000° C. 20 cubic meters of hydrogen from the NaCl-electrolyzer and from the HCl-electrolyzer were added to the water gas. The reducing gas mixture (1,902 cubic meters) entered the reduction chamber, where 1,425 kgs. of iron oxide were reduced to 1 metric ton of pure iron at a temperature of 1,000° C.

Steam used for power generation was recovered by the heat generated by cooling in various parts of the plant. The amount of heat obtained, approximately 2,656,000 kcal., yields 700 kw.-hrs., 180 kw.-hrs. of which are consumed for the electrolysis of HCl and NaCl (70 and 110 kw.-hrs. for the electrolysis of CCl and NaCl, respectively). Consequently 484 kw.-hrs. were made available for other purposes.

EXAMPLE III

A prepared mixture of rutile and magnetite was treated in an analogous manner to the treatment described in Examples I and II, but testing was done under laboratory conditions to measure the exact degree of efficiency of the reducing-chlorination and oxidizing-chlorination reactions.

The ore mixture had the following analysis:

| | Percent |
|---|---|
| Ti | 19.31 |
| Fe | 19.89 |
| Gangue and combined oxygen | 57.74 |
| Moisture | 3.06 |
| | 100.00 |

The ore mixture was divided into two portions, and a stoichiometric amount of charcoal was added to the first. Treatment proceeded in the previously described manner, and the gaseous product, and the residues of both reduction-chlorination and oxidation-chlorination chamber subjected to careful analysis. It was found that not even traces of titanium could be detected in the ferric chloride. The titanium content of the ore mixture in the oxidation-chlorination chamber, however, had increased by close to 10%. A colorimetric analysis of the ore residue from the reduction-chlorination chamber showed an iron content of approximately 0.001%. It has thus been shown that our invention produces an iron product entirely free of titanium, and that the waste gangue is an iron-free product suitable for the recovery of titanium.

What is claimed is:

1. Process for the recovery of high-purity iron from any iron oxide-bearing material that comprises, reducing-chlorination of a mixture of said iron oxide-bearing material and carbon at an elevated temperature to produce both iron and gangue constituents in the form of gaseous chlorides, oxidizing said gaseous chlorides together with free chlorine at an elevated temperature with additional quantities of fresh iron oxide-bearing material, with the production of solid oxides of the majority of said gangue constituents and additional quantities of gaseous ferric chloride, separating the resulting gaseous mixture from said solid oxides and iron-bearing material, condensing ferric chloride from said gaseous mixture, oxidizing said ferric chloride at an elevated temperature to produce pure iron oxide and free chlorine, and reducing said iron oxide to the metallic state with a reducing agent.

2. In a halide-metallurgical process for the extraction of iron values from any iron oxide-bearing material, the improvements that comprise, reducing chlorination of a mixture of said iron oxide-bearing materials to produce mixed gaseous chlorides including ferric chloride and free chlorine, thereafter subjecting said mixed gaseous chlorides and free chlorine to oxidation at an elevated temperature with additional quantities of fresh iron oxide bearing material to convert chlorides other than ferric chloride to their respective oxides with the simultaneous production of additional quantities of gaseous ferric chloride, separating said gaseous ferric chloride from said iron oxide-bearing material and such oxides and chlorides as are condensed above the condensation temperature of said ferric chloride, condensing said ferric chloride in substantially pure form, oxidizing said condensed ferric chloride in the presence of a free-oxygen containing gas to effect the production of pure iron oxide, and reducing said oxide to the metallic state.

3. In a halide-metallurgical process for the extraction of iron values from any iron oxide-bearing material, the improvements that comprise, reducing-chlorination of a mixture of iron oxide-bearing material and carbon at an elevated temperature to produce mixed gaseous chlorides including ferric chloride and free chlorine; thereafter subjecting said mixed gaseous chlorides and free chlorine to oxidation at an elevated temperature with fresh iron oxide-bearing material to convert chlorides other than iron to their respective oxides with the simultaneous production of additional quantities of gaseous ferric chloride, separating said gaseous ferric chloride from said iron oxide-bearing material and such oxides and chlorides as are condensed above the condensation temperature of said ferric chloride, condensing said ferric chloride in substantially pure form, and oxidizing said condensed ferric chloride in the presence of a free-oxygen containing gas to effect the production of pure iron oxide.

4. Process for the extraction of pure iron from any iron oxide-bearing material that comprises, crushing said material to a finely-divided state, chlorinating a mixture of said iron oxide-bearing material and finely-divided carbon by reacting said mixture in countercurrent to gaseous chlorine at a temperature within the range of from 800° to 1200° C. with the production of mixed gaseous ferric chloride and other gaseous chlorides including chlorides of phosphorus when present, and a waste gangue, separating said gaseous chlorides from said gangue, subjecting said gaseous chlorides and additional free chlorine to oxidation in countercurrent to fresh iron oxide-bearing material, and at a temperature within the range of from 800° to 1200° C., to effect oxidation of chlorides other than ferric chloride to their respective oxides with the simultaneous production of additional quantities of gaseous ferric chloride, separating the resulting gaseous mixture from said iron oxide-bearing material and such oxides and chlorides as are condensed above the condensation temperature of said ferric chloride, recycling the solids thereby recovered to said oxidation step, cooling said gaseous mixture to produce solid ferric chloride and a residual gas including the oxychloride of phosphorus when present, separating said ferric chloride from said residual gas, oxidizing said ferric chloride in the presence of a free oxygen containing gas to effect the production of pure iron oxide and free chlorine, separating said iron oxide from said chlorine, recycling said chlorine to said reducing-chlorination step, and reducing said pure iron oxide to the metallic state.

5. The process as claimed in claim 4, wherein said iron oxide-bearing material and said carbon are each crushed to a fine dust.

6. The process as claimed in claim 4, wherein said gaseous mixture, resulting from said oxidation step, is separated from mechanically entrained dust and gaseous heavy chlorides prior to condensation of said gaseous mixture, and said dust and heavy chlorides are recycled to said oxidation step.

7. The process as claimed in claim 4, wherein phosphorus values in said residual gas are recovered as phosphoric acid by adding water to said residual gas at a temperature between about 110° and 140° C.

8. The process as claimed in claim 7, wherein hydrogen chloride produced in said process is absorbed in water, and the resulting hydrochloric acid is subjected to electrolysis to effect evolution of free chlorine and hydrogen, and recycling said chlorine to the reducing-chlorination step and utilizing said hydrogen in the reduction of said iron oxide.

9. The process as claimed in claim 8, wherein additional chlorine and hydrogen and byproduct sodium hydroxide are provided by electrolysis of sodium chloride.

10. The process as claimed in claim 9, wherein solid chlorides are extracted with water from the waste gangue, the byproduct sodium hydroxide is admixed to the recovered chloride solution, forming thereby an alkaline chloride solution containing chlorides of metals other than iron contained in said ore, adding carbon dioxide to said solution so as to precipitate therefrom said chlorides other than iron as a carbonate sludge, separating said precipitate from said solution and recycling said solution to said electrolysis.

11. The process as claimed in claim 10, wherein carbon dioxide generated in said reducing-chlorination as well as said oxidation step and present in said residual gas is utilized to effect said precipitation after removal of phosphoric acid and hydrogen chloride therefrom.

12. The process as claimed in claim 4, wherein said condensation of ferric chloride is carried out by cooling the gaseous mixture derived from said oxidation, to a temperature within the range of from approximately 110° C. to 140° C.

13. The process as claimed in claim 4, wherein said oxidation of ferric chloride is carried out at a temperature within the range of from approximately 700 °C. to 800° C.

14. The process as claimed in claim 4, wherein said reduction is carried out with a gaseous reducing agent first purified of any contained sulfur, said purification being carried out by preliminarily contacting said reducing gas with powder of iron or iron oxide-bearing material.

15. The process as claimed in claim 4, wherein heat evolved during said process is utilized for the production of water vapor by means of which electric power is produced.

16. The process as claimed in claim 4, wherein the total of chlorine introduced in the reducing-chlorination and said oxidation steps is limited to a slight excess over the stoichiometric quantity necessary to chlorinate the total quantity of iron therein contained.

17. The process as claimed in claim 4, wherein said iron, after reduction to the metallic state, is further treated by melting together with carbon and alloying agents so as to form steel.

18. Process for the continuous production of pure iron from iron oxide-bearing material including ores and slags that comprises, crushing said iron oxide-bearing material to a finely-divided state, chlorinating a mixture of said material and finely-divided carbon by reacting said mixture in countercurrent to gaseous chlorine in a cyclone bank at a temperature within the range of from 800° to 1200° C., with the production of gaseous ferric chloride in admixture with other gaseous chlorides including chlorides of phosphorus and titanium when present, and a waste gangue, separating said gaseous chlorides from said gangue, subjecting said gaseous chlorides and additional free chlorine to oxidation in a cyclone bank in countercurrent to fresh iron oxide-bearing material, and at a temperature within the range of 800° to 1200° C. to effect the oxidation of chlorides other than ferric chloride to their respective oxides with the simultaneous production of additional quantities of gaseous ferric chloride, separating the resulting gaseous mixture from said iron oxide-bearing material and such oxides and chlorides as are condensed above the condensation temperature of said ferric chloride, recycling the solids thereby recovered to said reducing-chlorination step, cooling the resulting gaseous mixture to produce solid ferric chloride and a residual gas, separating said ferric chloride from said residual gas, oxidizing said ferric chloride with a free-oxygen containing gas to effect production of pure iron oxide and free chlorine, separating said iron oxide from said chlorine, recycling said chlorine to said reducing-chlorination step, and reducing said pure iron oxide to the metallic state.

19. The process as claimed in claim 18, wherein said gaseous mixture resulting from said oxidation is separated from mechanically entrained dust and gaseous heavy chlorides prior to condensation of said gaseous mixture, and said dust and heavy chlorides are recycled to said oxidation step.

20. The process as claimed in claim 18, wherein phosphorus values are recovered from said residual gas as phosphoric acid by adding water to said residual gas at a temperature between about 110° and 140° C.

21. The process as claimed in claim 18, wherein said iron, after reduction to the metallic state, is further treated by melting together with carbon and alloying agents so as to form steel.

References Cited by the Examiner

UNITED STATES PATENTS

| | | | |
|---|---|---|---|
| 901,611 | 10/1908 | Greenawalt | 75—112 X |
| 1,145,508 | 7/1915 | Perkins | 60—2 X |
| 1,173,467 | 2/1916 | Titus et al. | 75—112 |
| 1,453,057 | 4/1923 | Williams | 23—200 X |
| 1,468,741 | 9/1923 | Peacock | 23—165 |
| 1,489,361 | 4/1924 | Moxham | 23—200 X |
| 1,552,786 | 9/1925 | Wescott | 23—200 |
| 1,671,003 | 5/1928 | Baghdasarian (Bagsar) | 33—87 X |
| 2,030,867 | 2/1936 | Hart | 75—1 X |
| 2,184,884 | 12/1939 | Muskat et al. | 75—1 X |
| 2,797,155 | 6/1957 | Vaughan | 75—1 |

OTHER REFERENCES

Mellor: "Comprehensive Treatise on Inorganic and Theoretical Chemistry," Longmans, Green & Co., London, New York, Toronto, 1932, vol. 12, pp. 618, 757, vol. 13, p. 326, vol. 14, p. 141.

BENJAMIN HENKIN, *Primary Examiner*.

MAURICE A. BRINDISI, DAVID L. RECK, *Examiners*.